US011736803B2

(12) United States Patent
Kim et al.

(10) Patent No.: US 11,736,803 B2
(45) Date of Patent: Aug. 22, 2023

(54) FULL-SCREEN DISPLAY DEVICE

(71) Applicant: LG Display Co., Ltd., Seoul (KR)

(72) Inventors: Young-Tae Kim, Incheon (KR); Jun-Woo Jang, Seoul (KR); Tae-Yong Park, Paju-si (KR); Woong-Jin Seo, Gimpo-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/846,998

(22) Filed: Jun. 22, 2022

(65) Prior Publication Data

US 2022/0337748 A1 Oct. 20, 2022

Related U.S. Application Data

(63) Continuation of application No. 16/711,159, filed on Dec. 11, 2019, now Pat. No. 11,399,135.

(30) Foreign Application Priority Data

Dec. 26, 2018 (KR) ........................ 10-2018-0169515

(51) Int. Cl.
*G02B 27/62* (2006.01)
*H04N 23/698* (2023.01)
*G06T 3/40* (2006.01)

(52) U.S. Cl.
CPC ........... *H04N 23/698* (2023.01); *G02B 27/62* (2013.01); *G06T 3/4023* (2013.01)

(58) Field of Classification Search
CPC .. H04N 5/217; H04N 5/23238; H04N 5/3572; H04N 23/698; H04N 23/81; G02B 27/62; G06T 3/4023; G06F 3/0412; G06F 3/042–0428; G06V 40/1318; G09G 3/3208; G09G 2300/0408; G09G 2300/0439; G09G 2300/0465; G09G 2300/0469; G09G 2310/027; G09G 2320/0233

See application file for complete search history.

(56) References Cited

U.S. PATENT DOCUMENTS

| 10,552,696 B2 | 2/2020 | Cho et al. |
| 10,714,554 B2 | 7/2020 | Choo et al. |
| 10,917,549 B2 | 2/2021 | Jia |

(Continued)

FOREIGN PATENT DOCUMENTS

| CN | 1938854 A | 3/2007 |
| CN | 101604661 A | 12/2009 |

(Continued)

*Primary Examiner* — Amr A Awad
*Assistant Examiner* — Aaron Midkiff
(74) *Attorney, Agent, or Firm* — Seed IP Law Group LLP

(57) ABSTRACT

Disclosed herein is a full-screen display device capable of sufficiently securing light transmittance of a sensor area overlapping a sensor unit in a pixel array and minimizing deterioration in perceived image quality of the sensor area. The pixels are arranged in the sensor area overlapping the sensor unit in the pixel array of the full-screen display device such that the number of pixels gradually decreases from the outer periphery toward the center of the sensor area in units of masks, and the area of a transmission portion gradually increases from the outer periphery toward the center of the sensor area in units of masks.

16 Claims, 13 Drawing Sheets

(56) References Cited

U.S. PATENT DOCUMENTS

| | | | |
|---|---|---|---|
| 11,073,712 B2 | 7/2021 | Yeke Yazdandoost et al. | |
| 2007/0291325 A1 | 12/2007 | Toyota et al. | |
| 2008/0068324 A1* | 3/2008 | Chung | G09G 3/3648 |
| | | | 345/98 |
| 2009/0305453 A1 | 12/2009 | Yang et al. | |
| 2017/0017824 A1 | 1/2017 | Smith et al. | |
| 2018/0090103 A1 | 3/2018 | Zhang et al. | |
| 2018/0151656 A1* | 5/2018 | Choo | G09G 3/3258 |
| 2019/0310724 A1* | 10/2019 | Yeke Yazdandoost | |
| | | | H01L 27/3227 |
| 2020/0042759 A1* | 2/2020 | Kim | G06F 3/0446 |

FOREIGN PATENT DOCUMENTS

| | | | | |
|---|---|---|---|---|
| CN | 103713436 A | 4/2014 | | |
| CN | 108109582 A | 6/2018 | | |
| CN | 108234693 A | 6/2018 | | |
| CN | 108257514 A | 7/2018 | | |
| CN | 108810201 A | 11/2018 | | |
| CN | 110362237 A | 10/2019 | | |
| JP | 2013076950 A | 4/2013 | | |
| JP | 2017058671 A | 3/2017 | | |
| KR | 20180067196 A | 6/2018 | | |
| KR | 10-2018-0090506 | * | 8/2018 | G06F 3/0446 |

\* cited by examiner $$\text{LUMINANCE REDUCTION AMOUNT}(Y_R) = \frac{n}{\text{Mask size}} \times 100$$

*n=NUMBER OF REMOVED PIXELS $$\text{Boosting (B)} = \frac{100}{100-Y_R} \times 100$$

*BOOST LUMINANCE OF REMAINING PIXELS TO B(%) OF CURRENT LEVEL

MASK-UNIT LUMINANCE REDUCTION AMOUNT CALCULATION
S402

LUMINANCE BOOSTING (LUMINANCE CORRECTION)
S404

SENSOR UNIT TRANSMITTANCE AND IMAGE QUALITY IMPROVEMENT
S406

FULL-SCREEN DISPLAY DEVICE

CROSS-REFERENCE TO RELATED APPLICATION

This application claims the benefit of Korean Patent Application No. 10-2018-0169515, filed on Dec. 26, 2018, and U.S. patent application Ser. No. 16/711,159, filed on Dec. 11, 2019, which applications are hereby incorporated by reference as if fully set forth herein.

BACKGROUND

Technical Field

The present disclosure relates to a full-screen display device capable of sufficiently securing light transmittance of a sensor area overlapping a sensor unit in a pixel array and minimizing deterioration in perceived image quality of the sensor area.

Description of the Related Art

A portable electronic device such as a smartphone or a tablet personal computer (PC) includes a display panel located on a front surface thereof, and includes a camera and a sensor unit including various types of sensors located on a front surface of the display panel.

As a display device of a portable electronic device, a liquid crystal display (LCD), an organic light emitting diode (OLED) display using an OLED, etc., may be used. However, an OLED display, the shape of which may be freely changed, may be mainly used.

The sensor unit mounted along with the display panel has been generally located in a bezel surrounding a display area, that is, a pixel array area. However, recently, as the size of the bezel is reduced or a seamless structure is developed, a structure for implementing a full-screen display by disposing a sensor unit on a rear surface of a panel to overlap a pixel array has been proposed.

However, since light transmittance of the panel is lowered by the pixel array, it is difficult to secure light transmittance of a sensor area overlapping the sensor unit. Therefore, the sensing capability of the sensor unit may be lowered or the sensor unit may malfunction.

In order to secure light transmittance of the sensor unit, when the number of pixels of the sensor area is reduced, a sense of difference is perceived at a boundary of the sensor area due to a luminance difference, thereby deteriorating perceived image quality.

BRIEF SUMMARY

Accordingly, the present disclosure is directed to a full-screen display device that substantially obviates one or more problems due to limitations and disadvantages of the related art.

In various embodiments, the present disclosure provides a full-screen display device capable of sufficiently securing light transmittance of a sensor area overlapping a sensor unit in a pixel array and minimizing deterioration in perceived image quality of the sensor area.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a According to one or more embodiments of the present disclosure, a full-screen display device includes a panel including a pixel array in which a plurality of pixels are arranged and a sensor overlapping the pixel array and mounted on the panel, and the pixel array includes a sensor area overlapping the sensor. The pixels are arranged in the sensor area of the pixel array such that a number of the pixels gradually decreases from an outer periphery toward a center of the sensor area, and an area of transparent areas, in which the pixels are removed, gradually increases.

A plurality of gradation pixel patterns in which the number of the pixels gradually decreases in units of masks corresponding in number to the number of the pixels may be arranged in the sensor area of the pixel array from the outer periphery toward the center thereof.

The full-screen display device may further include a panel driver configured to drive the panel and a timing controller configured to control the panel driver, and the timing controller may correct luminance of image data of the pixels arranged in the sensor area of the pixel array to increase from the outer periphery toward the center of the sensor area.

The timing controller may calculate a luminance reduction amount of each of the plurality of gradation pixel patterns in the sensor area in units of masks, and boost and compensate for the luminance of the image of the pixels belonging to each gradation pixel pattern based on the calculated luminance reduction amount.

An order of the transparent areas in each of the plurality of gradation pixel patterns in which the number of the pixels gradually decreases may be determined according to a mask pattern.

A size of a mask corresponding to each gradation pixel pattern may be determined according to a total number of gradation steps in which the number of the pixels gradually decreases from the outer periphery toward the center of the sensor area.

The transparent areas are sequentially arranged at odd-numbered pixel positions and the transparent areas may be sequentially arranged at even-numbered pixel positions, in the plurality of gradation pixel patterns.

In some embodiments, the present disclosure provides a display device that includes a panel including a pixel array having a plurality of pixels. A sensor is mounted on the panel, and the pixel array has a sensor area overlapping the sensor. The pixels are disposed with a greater density in a first portion of the sensor area at an outer periphery of the sensor area than in a second portion of the sensor area at a center of the sensor area.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, preferred embodiments of the present disclosure will be described with reference to the drawings.

Figure 1:
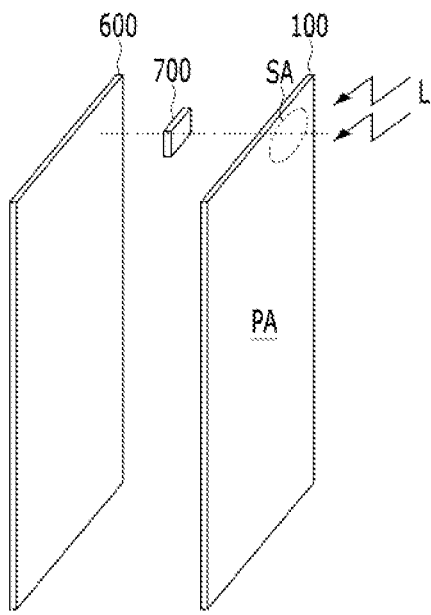
FIG. 1 is a view schematically showing a full-screen display device according to an embodiment of the present disclosure.
Figure 2:
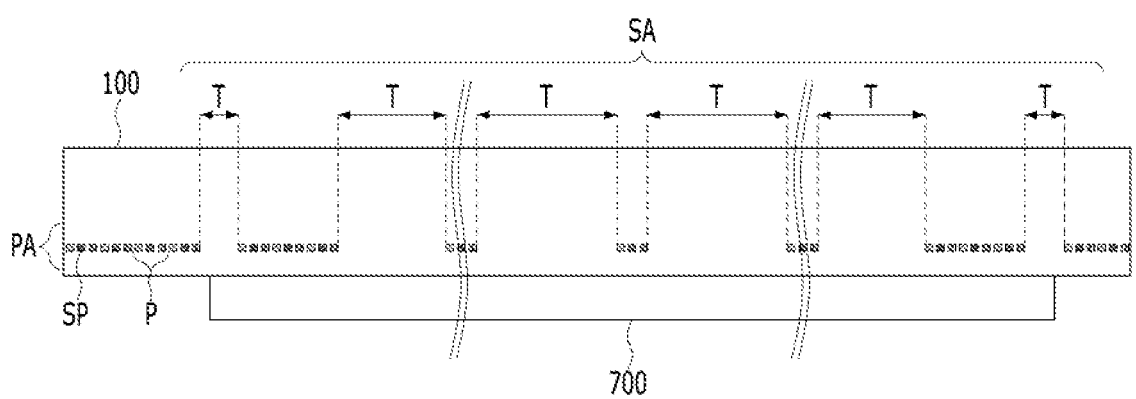
FIG. 2 is a cross-sectional view schematically showing a sensor area overlapping a sensor unit in a panel according to an embodiment of the present disclosure.

FIG. 1 is a view schematically showing a full-screen display device according to an embodiment of the present disclosure, and FIG. 2 is a cross-sectional view schematically showing a sensor assembly 700 (which may be referred to herein as a sensor unit 700) and a sensor area SA of a panel 100 according to an embodiment of the present disclosure.

Referring to FIGS. 1 and 2, the full-screen display device includes a display panel 100 including a pixel array PA and a sensor unit 700 mounted between the panel 100 and a rear case 600 and overlapping the pixel array PA of the panel 100.

The display panel 100 may output an image on a full screen, which is an entire display surface, through the pixel array PA including a plurality of pixels P for emitting light based on image data. The display panel 100 may have a structure in which the size of a bezel is small or a bezel is not perceived on the display surface. Each pixel P may include a plurality of subpixels SP having different colors and each subpixel SP may include an organic light emitting diode (OLED) independently driven by each pixel circuit. For example, the display panel 100 may be an OLED display panel, the shape of which may be freely changed. The display panel 100 may further include a touch sensor array (not shown) overlapping the pixel array PA, thereby sensing touch input through the entire display surface.

The sensor unit 700 may receive or transmit various types of sensed lights L such as external light or infrared light through a sensor area SA with low pixel density of the pixel array PA of the panel 100. For example, the sensor unit 700 may include various types of sensors such as an infrared sensor, an illumination sensor, etc. That is, the sensor unit 700 may be any sensor assembly that includes one or more sensors which may sense light.

In order to sufficiently secure light transmittance of the panel 100 corresponding to the sensor unit 700, the sensor area SA overlapping the sensor unit 700 has a pixel arrangement structure in which the density of pixels P, that is, the number of pixels, gradually decreases and a transparent area T in which the pixels P are not disposed gradually increases.

For example, as shown in FIG. 2, in the sensor area SA, the pixels are arranged in a gradation form in which the number of the pixels (the density of the pixels) gradually decreases from the outer periphery toward the center of the sensor area SA, thereby gradually increasing the transparent area T for transmitting light. This will be described later.

As a result, by the sensor area SA in which the number of pixels gradually decreases, the sensor unit 700 may sufficiently secure light transmittance and have sufficient sensing capability, thereby reducing a sense of difference perceived at the boundary of the sensor area SA.

Further, in the full-screen display device according to the embodiment, by gradually increasing luminance of the pixels P arranged in the sensor area SA from the outer periphery toward the center of the sensor area, it is possible to compensate for a luminance difference due to decrease in number of pixels and to minimize deterioration in perceived image quality. This will be described later.

Figure 3:
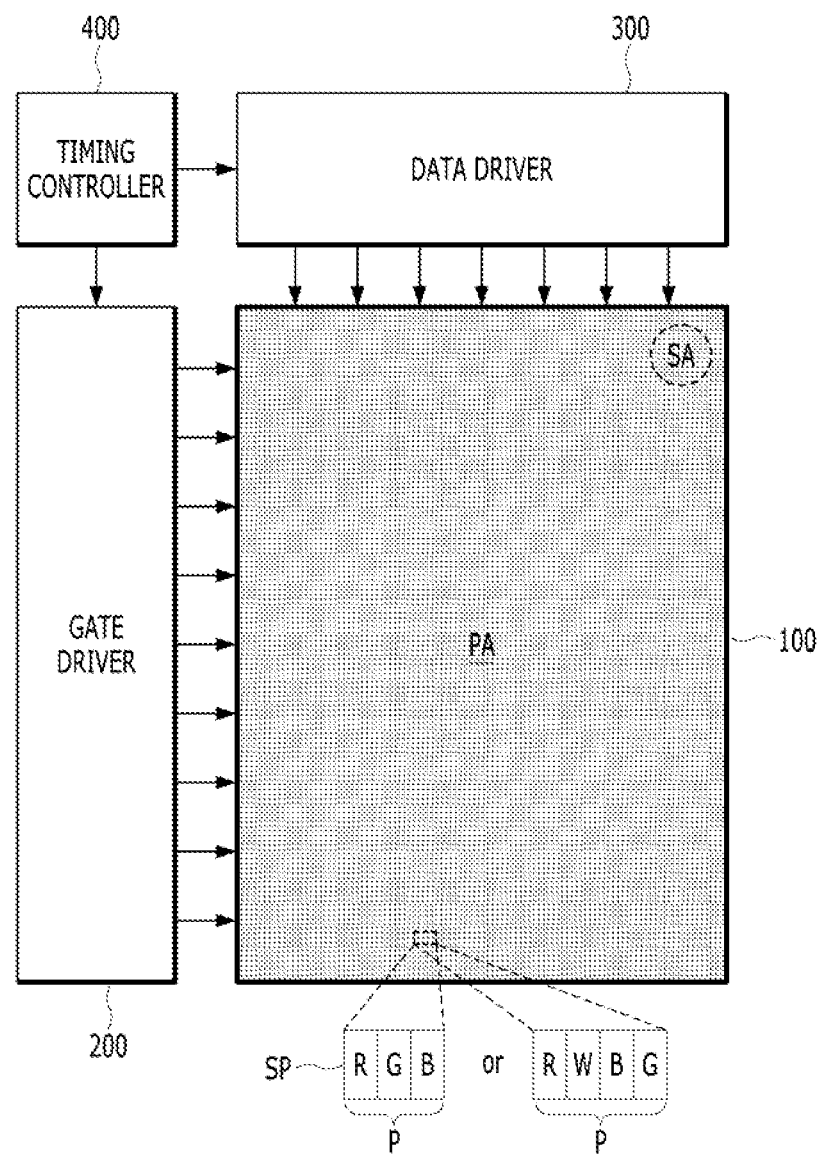
FIG. 3 is a block diagram schematically showing the circuit configuration of a display device according to an embodiment of the present disclosure.
Figure 4:
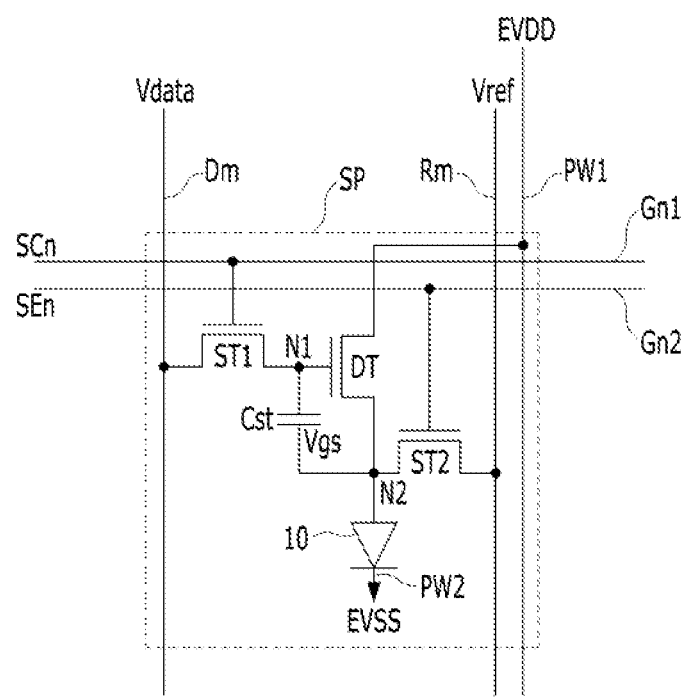
FIG. 4 is an equivalent circuit diagram of one subpixel according to an embodiment of the present disclosure.

FIG. 3 is a block diagram schematically showing the circuit configuration of a display device according to an embodiment of the present disclosure, and FIG. 4 is an equivalent circuit diagram of one subpixel according to an embodiment of the present disclosure.

Referring to FIG. 3, the full-screen display device according to the embodiment includes at least a panel 100, a gate driver 200, a data driver 300 and a timing controller 400 and may further include other components.

Each of the plurality of pixels P configuring the pixel array PA of the panel 100 may include subpixels SP having two, three or four of white (W), red (R), green (G) and blue (B). The pixel array PA includes a sensor area SA in which the number of pixels decreases in a gradation form, in order to secure light transmittance of the sensor unit 700. This will be described later.

Each subpixel SP may include an organic light emitting diode (OLED) element 10 (FIG. 4) independently driven by each pixel circuit.

For example, each subpixel SP may include an OLED element 10 connected between a high-potential driving voltage (EVDD) line PW1 and a low-potential driving voltage (EVSS) line PW2, and a pixel circuit including at least first and second switching TFTs ST1 and ST2, a driving TFT DT and a storage capacitor Cst in order to independently drive the OLED element 10, as shown in FIG. 4. The pixel circuit may have various configurations in addition to the configuration of FIG. 4.

As the switching TFTs ST1 and ST2 and the driving TFT DT, an amorphous silicon (a-Si) TFT, a polysilicon (poly-Si) TFT, an oxide TFT or an organic TFT may be used.

The OLED element 10 includes an anode connected to a source node N2 of the driving TFT DT, a cathode connected to the EVSS line PW2, and an organic light emitting layer between the anode and the cathode. The anode may be independently formed in each subpixel and the cathode may be a common electrode of all subpixels. When driving current is received from the driving TFT DT, electrons from the cathode are injected into the organic light emitting layer, holes from the anode are injected into the organic light emitting layer, and a fluorescent or phosphorescent material emits light due to re-coupling between the electrons and the holes in the organic light emitting layer, such that the light emitting element 10 generates light having brightness proportional to the current value of the driving current.

The first switching TFT ST1 is driven by a scan pulse SCn supplied from the gate driver 200 to one gate line Gn1 to supply a data voltage Vdata supplied from the data driver 300 to a data line Dm to the gate node N1 of the driving TFT DT.

The second switching TFT ST2 is driven by a sense pulse SEn supplied from the gate driver 200 to another gate line Gn2 to supply a reference voltage Vref supplied from the data driver 300 to a reference line Rm to a source node N2 of the driving TFT DT.

The storage capacitor Cst connected between the gate node N1 and the source node N2 of the driving TFT is charged with a driving voltage Vgs of the driving TFT DT which is a voltage difference between the data voltage Vdata and the reference voltage Vref respectively supplied to the gate node N1 and the source node N2 through the first and second switching TFTs ST1 and ST2, and holds the driving voltage Vgs during an emission period in which the first and second switching TFTs ST1 and ST2 are turned off.

The driving TFT DT controls current supplied from the EVDD line PW1 according to the driving voltage Vgs supplied from the storage capacitor Cst to supply driving current determined by the driving voltage Vgs to the light emitting element 10, such that the light emitting element 10 emits light.

The gate driver 200 and the data driver 300 shown in FIG. 3 may be defined as a panel driver for driving the panel 100.

The gate driver 200 is controlled according to a plurality of gate control signals received from the timing controller 400 to individually drive the gate lines Gn1 and Gn2 of the panel 100. The gate driver 200 supplies the scan signal of a gate on voltage to the gate lines in the driving period of the gate lines Gn1 and Gn2, and supplies a gate off voltage to the gate lines in the non-driving period of the gate lines Gn1 and Gn2.

The data driver 300 is controlled according to a data control signal received from the timing controller 400 to convert digital data received from the timing controller 400 into the data voltage Vdata and to supply the data voltage to each data line Dm of the panel 100. The data driver 300 supplies the reference voltage Vref to the reference line Rm.

The data driver 300 may sense a signal indicating the characteristics of each subpixel through the reference line Rm using the sensor unit using a voltage sensing method or a current sensing method, convert the sensed signal into sensing data, and supply the sensing data to the timing controller 400, under control of the timing controller 400.

The timing controller 400 controls the gate driver 200 and the data driver 300 using timing control signals received from a system and timing setting information stored therein. The timing control signals may include a dot clock, a data enable signal, a vertical synchronization signal, a horizontal synchronization signal, etc. The timing controller 400 generates a plurality of gate control signals for controlling the driving timings of the gate driver 200 and supplies the gate control signals to the gate driver 200.

The timing controller 400 generates a plurality of data control signals for controlling the driving timings of the data driver 300 and supplies the data control signals to the data driver 300.

The timing controller 400 may perform various image processes for image quality correction with respect to the image data received from the system and reduce power consumption by analyzing the image data and controlling image luminance.

In particular, the timing controller 400 may compensate for the luminance of the image data of the pixels P of the sensor area SA in which the number of pixels decreases in the gradation form in order to secure the light transmittance of the sensor unit 700 in the pixel array PA, and supply the image data through the data driver 300. This will be described later.

The timing controller 400 may apply compensation data for characteristic deviation of each subpixel stored in a memory to further correct the image data. To this end, the timing controller 400 controls the gate driver 200 and the data driver 300 to drive the panel 100 in a sensing mode, sense the characteristics of the driving TFT DT or the OLED element 10 of each subpixel SP of the panel 100 through the data driver 300, and update Vth compensation data, mobility compensation data and deterioration compensation data of each subpixel stored in the memory using the result of sensing.

Figure 5:
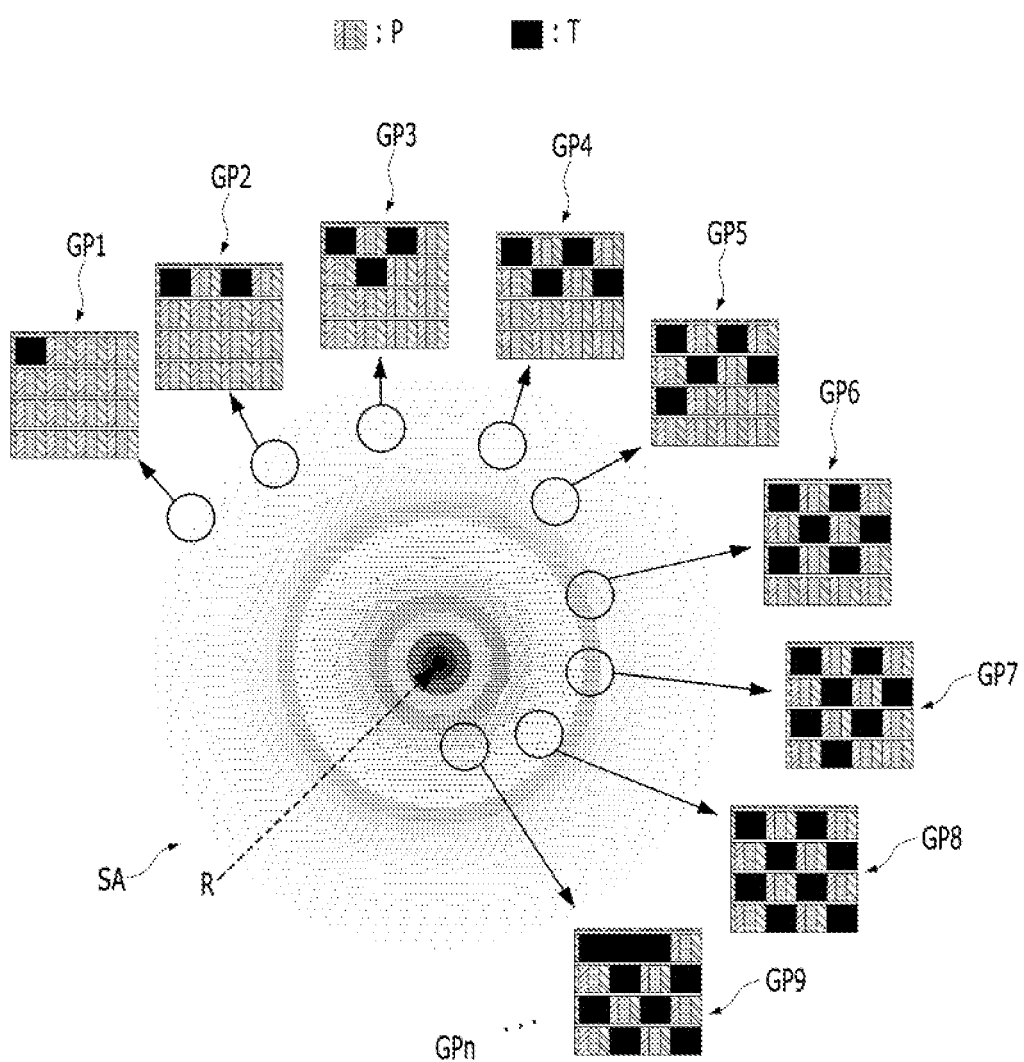
FIG. 5 is a view schematically showing a pixel arrangement structure of a sensor area of a pixel array according to an embodiment of the present disclosure.

FIG. 5 is a view schematically showing a pixel arrangement structure of a sensor area of a pixel array according to an embodiment of the present disclosure.

Referring to FIG. 5, the sensor area SA overlapping the sensor unit 700 in the pixel array PA may have a circular shape. The pixels P may be arranged in the sensor area SA in a gradation form in which the number of pixels P having the same size gradually decreases from the outer periphery toward the center in a radial direction R. As a result, the number (area) of transparent areas T having the same size as the pixels P may gradually increase.

In other words, a plurality of gradation patterns GP1 to GPn in which the number of pixels gradually decreases from the outer periphery toward the center in the radial direction R may be arranged stepwise in the sensor area SA. The plurality of gradation pixel patterns GP1 to GPn have the same unit mask size m*m. The plurality of gradation pixel patterns GP1 to GPn has a structure in which the transparent area T is arranged at a position where the pixel P is removed, that is, the number of transparent areas T increases one by one as the number of pixels decreases one by one.

For example, the plurality of gradation pixel patterns GP1 to GPn located in the sensor area SA in the radial direction R may have a pattern in which pixels P of odd-numbered positions are sequentially removed and then pixels P of even-numbered positions are sequentially removed. In other words, in the plurality of gradation pixel patterns GP1 to GPn, the transparent areas T are sequentially arranged at odd-numbered pixel positions and then the transparent areas T may be sequentially arranged at the even-numbered pixel positions. The positions and order of removed pixels in the gradation pixel patterns GP1 to GPn may be determined by a gradation mask used in the manufacturing step.

Figure 6:
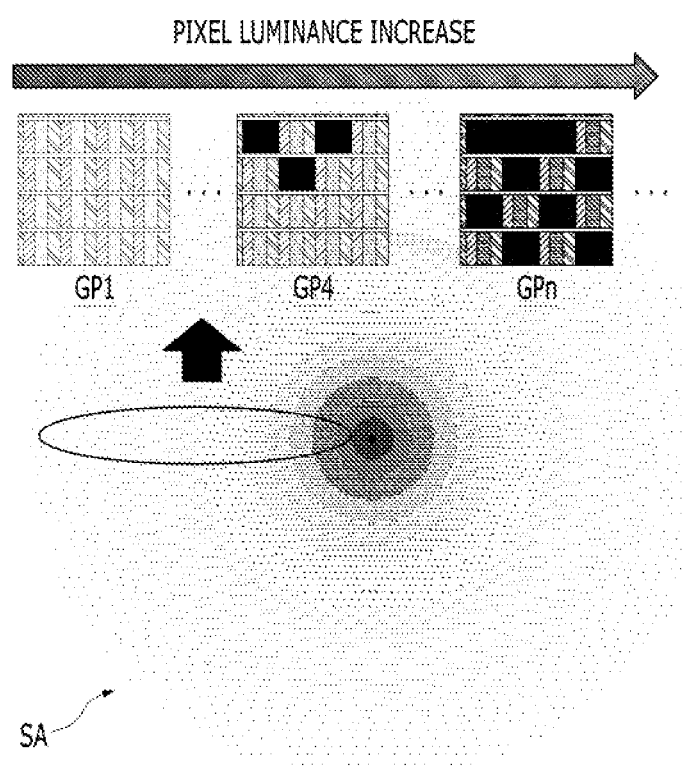
FIG. 6 is a view schematically showing a luminance compensation method of a sensor area of a pixel array according to an embodiment of the present disclosure.
Figure 7A:
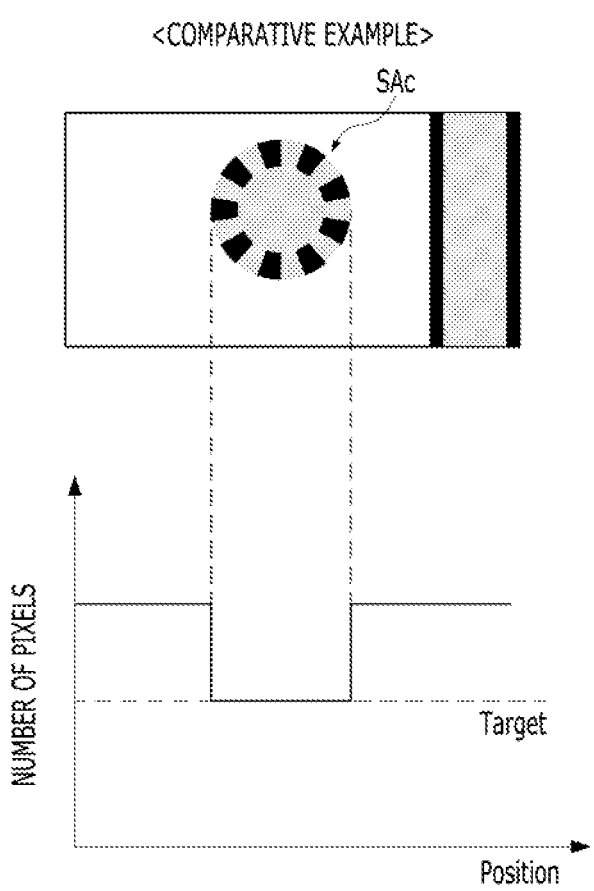
FIGS. 7A to 7C are views showing comparison in luminance compensation result of a sensor area between a display device according to an embodiment of the present disclosure and a comparative example.
Figure 7B:
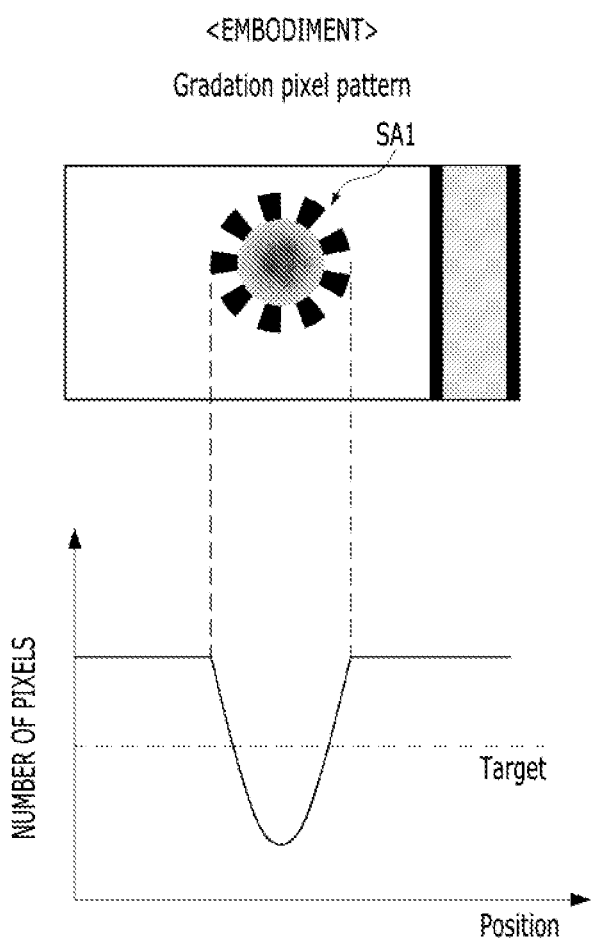
Figure 7C:
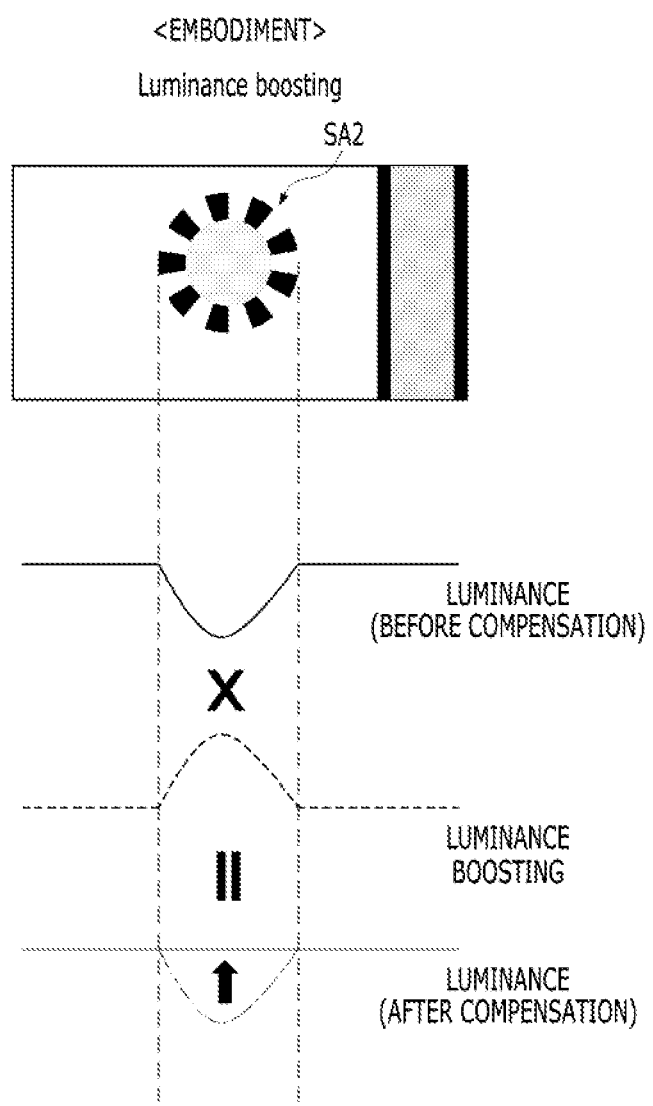

FIG. 6 is a view schematically showing a luminance compensation method of a sensor area of a pixel array according to an embodiment of the present disclosure. FIGS. 7A to 7C are views showing comparison in luminance of the sensor area between a display device according to an embodiment of the present disclosure and a comparative example.

Referring to FIG. 6, the timing controller 400 may calculate the luminance reduction amount of the gradation pixel patterns GP1 to GPn, in which the number of pixels gradually decreases in the sensor area SA, in units of masks, and then increase the luminance of the pixels remaining in each pattern based on the calculated luminance reduction amount, thereby compensating for a luminance difference due to decrease in number of pixels.

Referring to FIG. 7A, it can be seen that the luminance difference is rapidly changed in the sensor area SAc of the comparative example, in which the number of pixels constantly decreases, and a sense of difference is perceived at the boundary of the sensor area SAc. Referring to FIG. 7B, it can be seen that luminance gradually decreases in the sensor area SA1 according to the embodiment in which the number of pixels decreases in a gradation form. Referring to FIG. 7C, it can be seen that a luminance difference is not perceived in the sensor area SA2 according to the embodiment, in which the amount of luminance decreased by decrease in number of pixels is compensated, and thus perceived image quality is improved.

Figure 8:
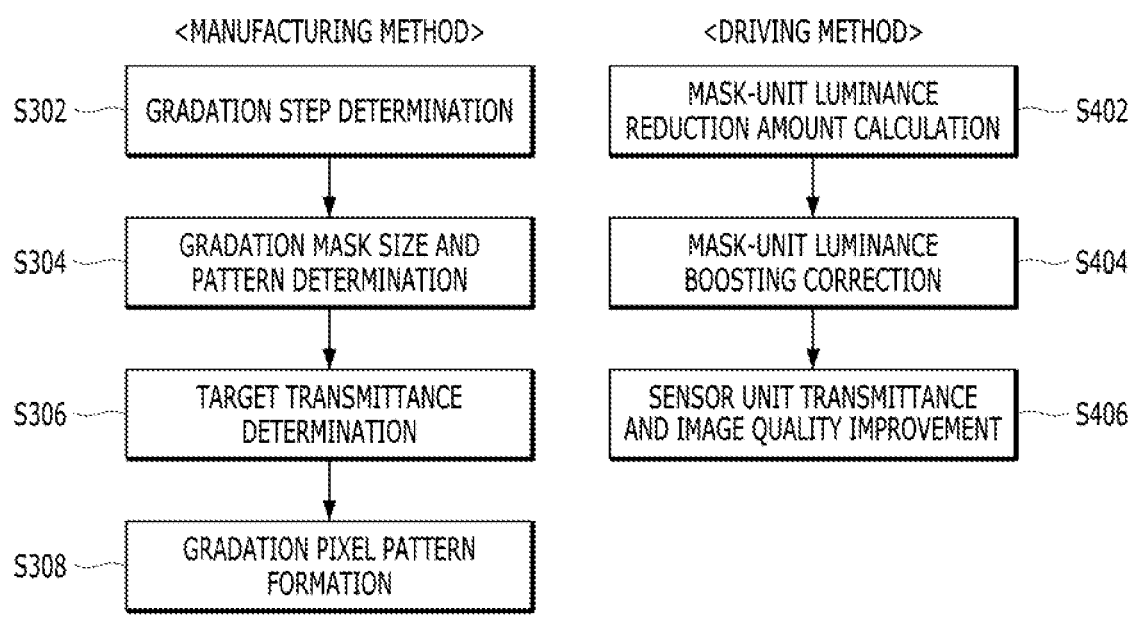
FIG. 8 is a flowchart illustrating a pixel structure determination method and a driving method of a full-screen display device according to an embodiment of the present disclosure.
Figure 9:
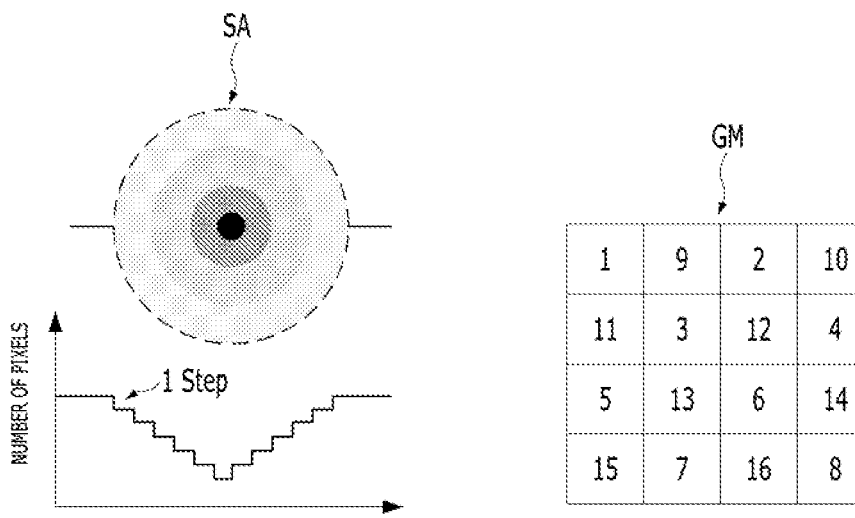
FIG. 9 is a view sequentially showing a pixel structure determination method of a pixel array according to an embodiment of the present disclosure.
Figure 9:
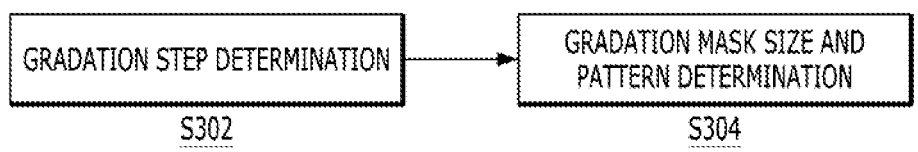
Figure 9:
Figure 9:
Figure 9:
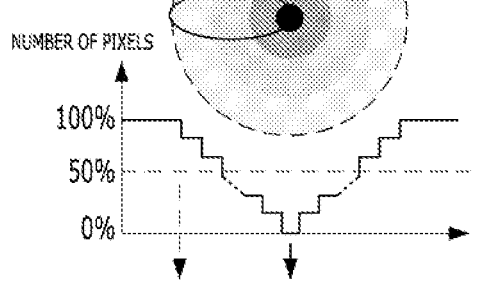
Figure 9:
Figure 10:
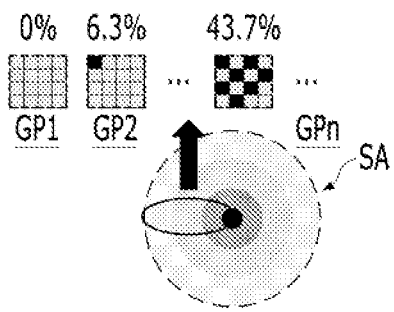
FIG. 10 is a view showing a luminance correction method of a pixel array according to an embodiment of the present disclosure in stages.
Figure 10:
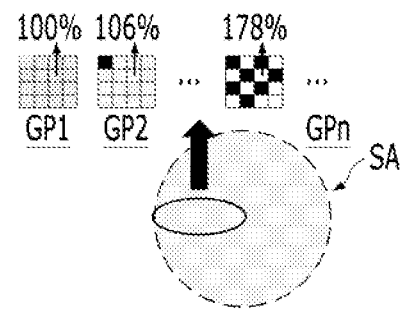
Figure 10:
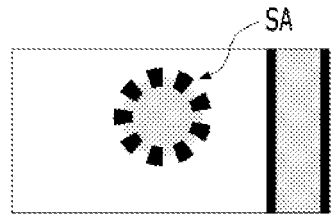
Figure 10:
Figure 10:
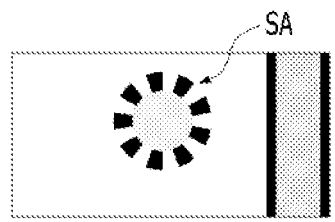

FIG. 8 is a flowchart illustrating a pixel structure determination method and a driving method of a full-screen display device according to an embodiment of the present disclosure. FIG. 9 is a view sequentially showing a pixel structure determination method of a pixel array according to an embodiment of the present disclosure. FIG. 10 is a view showing a luminance correction method of a pixel array according to an embodiment of the present disclosure in stages.

Referring to FIG. 8, the pixel structure determination method performed by an apparatus for manufacturing a full-screen display (FSD) may include a gradation step determination step S302, a gradation mask size and pattern determination step S304, a target transmittance determination step S306, that is, a step of determining the number of reduced target pixels, and a gradation pixel pattern formation step S308. The luminance correction method of the FSD may include a mask-unit luminance reduction amount calculation step S402, a mask-unit luminance correction step S404 and a sensor-unit transmittance and perceived image quality improvement step S406.

Referring to FIGS. 8 and 9, the apparatus for manufacturing the FSD determines a maximum number of gradation steps of gradually decreasing the number of pixels applied according to the size of the sensor area SA in the pixel array, in the gradation step determination step S302. The gradation step for the sensor area SA is determined such that the number of pixels gradually decreases from the outer periphery toward the center.

Subsequently, the apparatus for manufacturing the FSD determines a mask size and pattern based on the determined gradation steps, in the gradation mask size and pattern determination step S304. For example, if the number of gradation steps is 16, as shown in FIG. 9, a gradation mask GM having a size of 4*4 is determined and the order of sequentially removed pixels in the mask pattern GM is determined.

Subsequently, the apparatus for manufacturing the FSD determines to which percent of the current level the number of pixels is reduced, that is, determines the number of target pixels, in the sensor area SA according to the appropriate transmittance of the sensor unit 700, in the target transmittance determination step S306. For example, in FIG. 9, it may be determined that the number of target pixels may be reduced by 50% in the sensor area SA.

In addition, the apparatus for manufacturing the FSD may apply the gradation masks GM1 to GMn such that the average number of pixels becomes equal to the number of target pixels in the sensor area SA, and form the pixels such that the number of pixels gradually decreases from the outer periphery toward the center in the sensor area SA, in the gradation pixel pattern formation step S308. For example, the number of pixels formed in the sensor area SA may gradually decrease in the order of gradation masks GM1 to GMn shown in black, which indicates the positions where the pixels are removed as shown in FIG. 9.

Referring to FIGS. 8 and 10, the timing controller 400 of the FSD according to the embodiment calculates the luminance reduction amount of the gradation pixel patterns GP1 to GPn in the sensor area SA in units of masks, in the mask-unit luminance reduction amount calculation step S402. For example, the timing controller 400 may calculate the luminance reduction amount $Y_R$ of each of the gradation pixel patterns GP1 to GPn as shown in FIG. 10 and Equation 1 below.

$$Y_R = \frac{n}{Masksize} \times 100 \qquad \text{Equation 1}$$

In Equation 1 above, n denotes the number of removed pixels in each of the gradation pixel patterns GP1 to GPn.

Next, the timing controller 400 of the FSD according to the embodiment performs luminance boosting for boosting the luminance of the pixels remaining in each of the pixel patterns GP1 to GPn to B % of a current level, based on the luminance reduction amount $Y_R$ of each of the gradation pixel patterns GP1 to GPn calculated in the above step, in the mask-unit luminance correction step S404, as shown in FIG. 10 and Equation 2 below.

$$Boosting(B) = \frac{100}{100 - Y_R} \times 100 \qquad \text{Equation 2}$$

In addition, the timing controller 400 of the FSD may improve the perceived image quality and the transmittance of the sensor area SA overlapping the sensor unit as shown in FIG. 10 (S406), by supplying luminance-corrected image data to the panel 100 through the panel drivers 200 and 300 and driving the pixel array PA.

Figure 11:
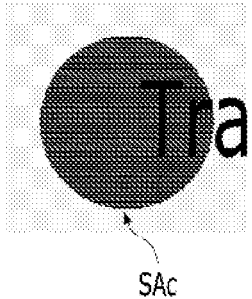
FIG. 11 is a view showing comparison in image quality simulation result of a sensor area between a full-screen display device according to an embodiment of the present disclosure and a comparative example.

FIG. 11 is a view showing comparison in image quality simulation result of a sensor area between a full-screen display device according to an embodiment of the present disclosure and a comparative example.

Referring to FIG. 11, it can be seen that, as the result of comparison in perceived image quality among the sensor areas SAc, SA1 and SA2 in which the number of target pixels is reduced to about 75% of the current level in the pixel array, a luminance difference of the boundary is clearly perceived in the sensor area SAc of the comparative example in which the number of pixels constantly decreases, and thus perceived image quality is not good.

In contrast, it can be seen that a luminance difference of the boundary is reduced in the sensor area SA1 according to the embodiment in which the number of pixels decreases in the gradation form, and the luminance difference of the boundary is further reduced and perceived image quality is improved in the sensor area SA2 according to the embodiment in which the number of pixels decreases in the gradation form and luminance boosting correction is applied.

As described above, the pixel array of the full-screen display device according to the embodiment has a gradation-type pixel arrangement structure in which the number of pixels gradually decreases in the sensor area overlapping the sensor unit from the outer periphery toward the center and the number of transparent areas gradually increases. In the full-screen display device according to the embodiment, the sensor unit overlapping the pixel array can sufficiently secure light transmittance, have sufficient sensing capability, and reduce a sense of difference perceived at the boundary of the sensor unit.

In the full-screen display device according to the embodiment, the luminance of the pixels arranged in the sensor area such that the number of pixels decreases in the gradation form gradually increases from the outer periphery toward the center of the sensor area, thereby minimizing deterioration in the perceived image quality of the sensor area.

It will be apparent to those skilled in the art that various modifications and variations can be made in the present disclosure without departing from the spirit or scope of the disclosure. Therefore, the technical scope of the present disclosure should not be limited to the detailed description of the specification, but should be defined by the claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A display panel comprising:
a pixel array including a plurality of pixels; and
a touch sensor array overlapping the pixel array,
wherein the pixel array includes a sensor area,
wherein the pixels and transparent areas are arranged in the sensor area of the pixel array, and
wherein a number of the transparent areas on a first imaginary line which passes a center of the sensor area is larger than a number of the transparent areas on a second imaginary line which does not pass the center of the sensor area, and in each of the first imaginary line and the second imaginary line, a first pixel positioned closer to the center of the sensor area is configured to have a higher luminance than a second pixel positioned further away from center of the sensor area.

2. The display panel of claim 1,
wherein a length of the first imaginary line overlapping the sensor area is longer than the second imaginary line overlapping the sensor area.

3. The display panel of claim 1,
wherein each of the pixels includes a switching TFT and a driving TFT,
wherein at least one of the switching TFT and the driving TFT includes an oxide TFT.

4. The display panel of claim 1,
wherein a number of the transparent areas surrounded by the pixels increases from an outer periphery toward a center of the sensor area.

5. The display panel of claim 1,
wherein the sensor area has a plurality of unit patterns, each of the unit patterns has at least one of the pixels and at least one of the transparent areas,
wherein the plurality of unit patterns include a first unit pattern having the same number of the transparent areas and the pixel areas.

6. The display panel of claim 5,
wherein the transparent areas and the pixel areas are alternately disposed in the first unit pattern.

7. The display panel of claim 5,
wherein the plurality of unit patterns include a second unit pattern between the center of the sensor area and the first unit pattern having the transparent areas more than the pixel areas.

8. The display panel of claim 7,
wherein the plurality of unit patterns include a third unit pattern between an outer periphery of the sensor area and the first unit pattern having the pixel areas more than the transparent areas.

9. The display panel of claim 1,
wherein the touch sensor array overlaps with the sensor area.

10. The display panel of claim 1,
wherein the sensor area is symmetrical with respect to the first imaginary line.

11. A display device comprising:
a panel including a pixel array in which a plurality of pixels is arranged; and
a sensor on the pixel array of the panel,
wherein the pixel array includes a sensor area overlapping the sensor,
wherein the pixels are arranged in the sensor area of the pixel array, and
wherein a number of the pixels on a first imaginary line which passes a center of the sensor area is less than a number of the pixels on a second imaginary line which does not pass the center of the sensor area, and in each of the first imaginary line and the second imaginary line, a first pixel positioned closer to the center of the sensor area is configured to have a higher luminance than a second pixel positioned further away from center of the sensor area.

12. The display device of claim 11,
wherein the pixels in the sensor area are symmetrical with respect to the first imaginary line.

13. The display device of claim 11, further comprising a data driver for supplying a data signal to the pixels,
wherein the sensor area is adjacent to the data driver.

14. The display device of claim 11,
wherein the pixels are arranged in the sensor area of the pixel array such that a number of the pixels decreases from an outer periphery toward a center of the sensor area.

15. The display device of claim 14, further comprising a panel driver configured to drive the panel and a timing controller configured to control the panel driver,
wherein the timing controller corrects luminance of image data of the pixels arranged in the sensor area of the pixel array to increase from the outer periphery toward the center of the sensor area.

16. The display device of claim 11,
wherein the sensor includes at least one of an infrared sensor and a camera.

* * * * *